United States Patent [19]

Lorincz et al.

[11] Patent Number: 4,728,237
[45] Date of Patent: Mar. 1, 1988

[54] DRIVABLE PICTURE FRAME HANGER

[75] Inventors: Eugene Lorincz, Cinnaminson, N.J.; Marlin J. Hoskinson, Philadelphia, Pa.

[73] Assignee: Moore Push-Pin Company, Wyndmoor, Pa.

[21] Appl. No.: 905,769

[22] Filed: Sep. 10, 1986

[51] Int. Cl.⁴ .................. A47G 1/16; F16B 15/00
[52] U.S. Cl. ........................... 411/451; 248/496; 248/497; 411/457; 411/487; 411/497; 411/922; D8/371; D8/373; D8/390
[58] Field of Search .............. 411/451, 439, 446, 452, 411/453, 454, 455, 456, 457, 458, 459, 460, 477, 487, 488, 489, 490, 493, 497, 922, 923, 461, 462, 465; 248/495, 496, 497, 498, 216.1; D8/373, 388, 389, 390, 371

[56] References Cited

U.S. PATENT DOCUMENTS

| | | |
|---|---|---|
| 84,585 | 12/1868 | Sargent . |
| D. 282,525 | 2/1986 | Samson et al. ............ D8/373 |
| 318,566 | 5/1885 | Jones . |
| 546,269 | 9/1895 | Coutant . |
| 852,247 | 4/1907 | Tuell et al. . |
| 911,273 | 2/1909 | Scott . |
| 1,092,351 | 4/1914 | Garrity . |
| 1,181,764 | 5/1916 | Heikkila ............ 411/922 X |
| 2,128,730 | 8/1938 | Murphy ............ 411/457 X |
| 2,304,036 | 12/1942 | Tegarty ............ 411/456 X |
| 2,373,311 | 4/1945 | Holmes . |
| 2,649,831 | 8/1953 | Anstett . |
| 2,867,807 | 1/1959 | Anstett . |
| 3,224,799 | 12/1965 | Blose ............ 411/411 X |
| 3,719,342 | 3/1973 | Kupersmit ............ 248/216 |
| 3,848,080 | 11/1974 | Schmidt ............ 248/216.1 X |
| 4,030,261 | 6/1977 | Coleman ............ 411/922 X |
| 4,165,242 | 8/1979 | Kelly et al. ............ 411/548 X |
| 4,333,625 | 6/1982 | Haug ............ 248/216.1 |

FOREIGN PATENT DOCUMENTS

| | | |
|---|---|---|
| 1006489 | 3/1977 | Canada ............ 248/216.1 |
| 2811971 | 9/1979 | Fed. Rep. of Germany ... 248/216.1 |
| 659331 | 2/1929 | France ............ 411/456 |

Primary Examiner—Lloyd A. Gall
Attorney, Agent, or Firm—Howson and Howson

[57] ABSTRACT

A hanger adapted to be driven into a wooden frame member includes a one-piece stamped metal member having a head and a flat elongate symmetrical shank with a series of lands and grooves disposed on opposite sides of the longitudinal axis of the shank between its tip and a pair of laterally extending shoulders on its head. Inclined camming surfaces extend between the lands and grooves and cooperate therewith to compress the wood fibers laterally of the shank as it is driven into the wood. A lateral gripping surface behind each land surface engages the wood fibers which expand into the distally adjacent groove to provide a positive gripping action which resists disengagement.

13 Claims, 5 Drawing Figures

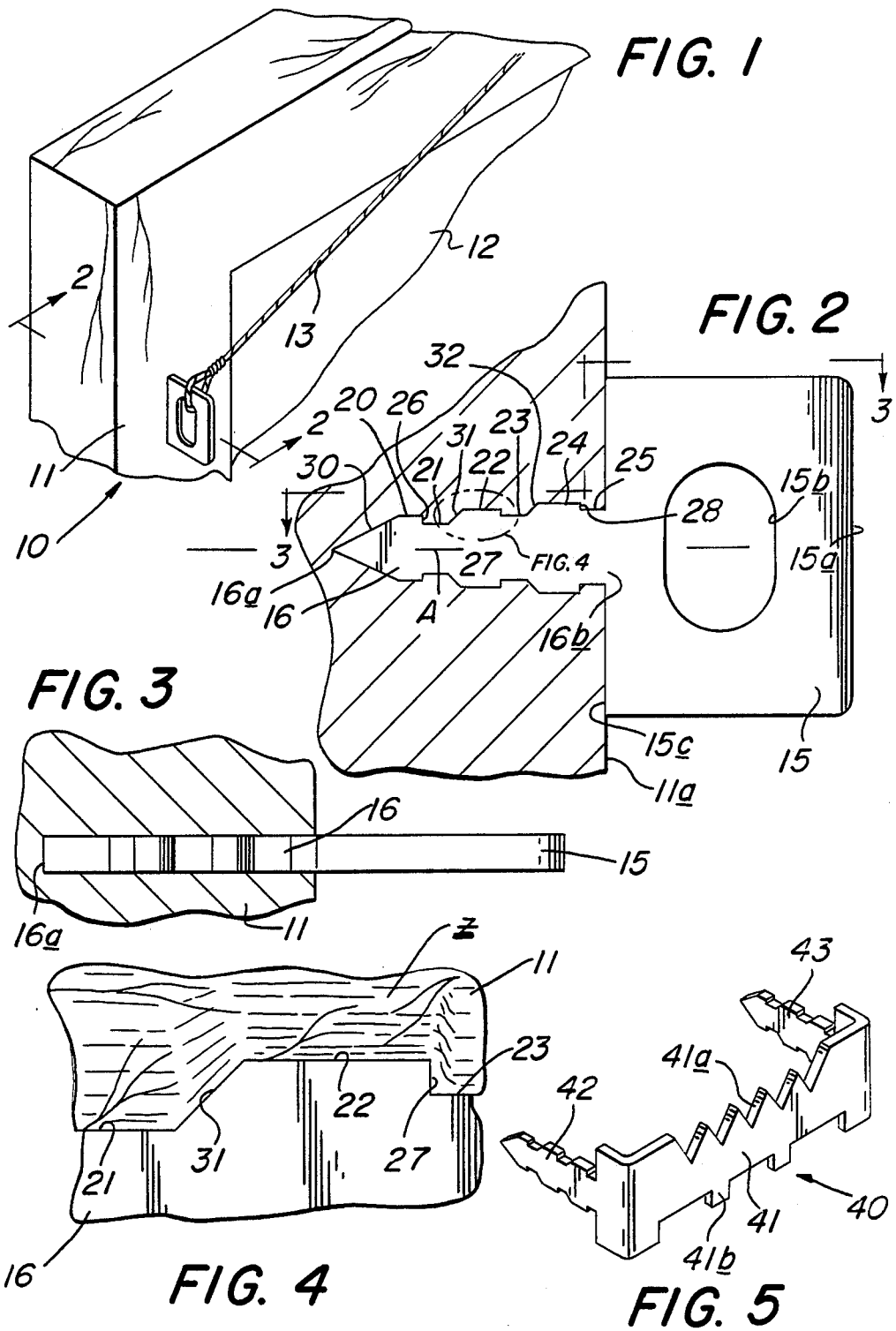

4,728,237

DRIVABLE PICTURE FRAME HANGER

FIELD OF THE INVENTION

The present invention relates to picture frame hangers, and more particularly, the present invention relates to hangers which are adapted to be driven into a picture frame for enabling it to be hung from a wall.

BACKGROUND OF THE INVENTION

For many years, screw eyes have been used to enable wires to be fastened to the backsides of picture frames so that the frames may be hung from hooks on a wall. The conventional screw eye has a threaded shank and an integral closed eye. Since it must be rotated into the wooden frame, installation is labor intensive.

There is a need for hangers, such as screw eyes, which can be fastened to a wooden frame simply by being driven into place, as by a hammer, or which can be fed automatically from a magazine and driven, in the manner of a staple. Such hangers are particularly attractive to frame manufacturers because they are less labor intensive to install. While known drivable hangers are efficient to install, they have not been as satisfactory as desired because their shanks lack sufficient holding power for many applications.

To augment the holding power of a drivable shank, some have proposed the use of barbs on shanks, such as nails, rail spikes, staples and the like. Examples of barbed nails and spikes may be found in the following U.S. Pat. Nos. 318,566; 546,269; 911,273; 1,092,351; 2,373,311; and 2,649,831. Staples having barbed shanks are disclosed in U.S. Pat. Nos. 84,585 and 2,867,807. Miscellaneous fasteners having specially formed shanks are disclosed in U.S. Pat. Nos. 852,247 and 3,719,342. U.S. Pat. No. Des. 282,525, owned by the assignee of the present application, discloses an adjustable picture hanger having a pair of specially formed shanks adapted to be driven into a picture frame.

While each of the aformentioned patented articles may function satisfactorily for its intended purpose, there is a need for a picture hanger which can be driven into a wooden frame yet which can resist disengagement under most anticipated loading conditions.

OBJECTS OF THE INVENTION

With the foregoing in mind, a primary object of the present invention is to provide an improved drivable picture frame hanger.

Another object of the present invention is to provide a novel picture frame hanger which can be driven into a wooden frame yet which resists being dislodged.

A further object of the present invention is to provide a unique drivable picture frame hanger which can be manufactured economically using high speed mass production equipment.

SUMMARY OF THE INVENTION

More specifically, the present invention provides a picture frame hanger which can be driven into a wooden frame member yet which is difficult to dislodge. The hanger includes a one-piece stamped metal member having a head and an elongate shank depending therefrom. The head has a pair of laterally extending shoulders at the distal end of the shank, and the shank has a pointed tip at its proximal end. The shank is provided with edge means defining a series of lands and grooves which are parallel to the longitudinal axis of the shank and which are spaced apart along its length with distally adjacent lands and grooves being spaced apart further from the longitudinal axis of the shank. Inclined camming surfaces are provided between the lands and the grooves at the distal ends of the grooves, and transverse gripping surfaces are provided at the distal ends of the lands. The camming surfaces compress the wood fibers laterally as the shank penetrates the wooden frame member while the grooves permit the compressed wood fibers to expand and fill the grooves behind the gripping surfaces to provide a positive locking action which resists separation.

BRIEF DESCRIPTION OF THE DRAWINGS

The foregoing and other objects, features and advantages of the present invention should become apparent from the following description when taken in conjunction with the accompanying drawings, in which:

FIG. 1 is an enlarged fragmentary perspective view of a hanger which embodies the present invention and which is illustrated embedded in the backside of a wooden picture frame;

FIG. 2 is an enlarged sectional view taken on line 2—2 of FIG. 1;

FIG. 3 is a sectional view taken on irregular line 3—3 of FIG. 2;

FIG. 4 is a greatly enlarged fragmentary sectional view of the portion of the hanger shank delineated in FIG. 2; and FIG. 5 is a perspective view of a modified embodiment of the present invention.

DESCRIPTION OF THE PREFERRED EMBODIMENTS

Referring now to the drawings, FIG. 1 illustrates a hanger 10 which embodies the present invention. The hanger 10 is shown embedded in the backside of a wooden frame member 11 forming a portion of a picture frame 12. The hanger 10 is shown connected to a wire 13 adapted to be hung on a wall hook (not shown).

According to the present invention the hanger 10 is simply driven into the frame member 11. To this end, as best seen in FIG. 2, the hanger 10 includes a head 15 and an integral shank 16. The head 15 and shank 16 are preferably stamped in a progressive die from a flat sheet of metal, such as steel. The head 15 has a transverse outer edge 15a adapted to be struck by an implement, such as hammer for driving the shank 16 lengthwise on its longitudinal axis A into the wooden frame member 11. The head 15 also has a pair of shoulders 15c, 15d which extend laterally outward from the shank 16 perpendicular to its longitudinal axis A. The shoulders 15c, 15d engage the outer surface 11a of the wooden frame member 11 in the manner illustrated in FIG. 2 when the hanger 10 is driven into place. The head 15 also has an oblate aperture 15b formed therein for receiving the hanger wire 13. The aperture 15b is disposed with its major axis transverse to the longitudinal axis A of the shank 16.

To enhance the capability of the hanger 10 to resist disengagement from the frame member 11, the shank 16 is provided with specially-shaped surface means on opposite sides of its longitudinal axis A between its pointed proximal tip 16a and its distal base 16b located at the juncture of the shank 16 and the head 15. The specially-shaped surfaces are symmetrical with respect to the longitudinal axis A of the shank 16 so that the surfaces above the axis A are aligned with and are identical to the surfaces located below the axis A. The specially-shaped surfaces permit the hanger 10 to be driven easily into the wooden frame member 11 while coacting therewith to resist disengagement therefrom.

As best seen in FIG. 2, the specially-shaped surfaces on the shank 16 include a series of land surfaces 20, 22 and 24 provided by edges extending parallel to the axis A of the shank 16. Each distally adjacent land surface is spaced further from the axis A than its preceding land surface. Thus, the land surface 22 is spaced further from the axis A than the land surface 20, and the land surface 24 is spaced further from the axis A than the land surface 22.

A series of groove surfaces 21, 23 and 25 are provided on the shank 16 between the land surfaces 20, 22 and 24, respectively. Each distally adjacent groove surface is spaced further from the axis A of the shank 16 than its preceding groove surface, and each groove surface extends parallel to the shank axis A. Thus, the groove surface 23 is spaced further from the axis A than the groove surface 21, and the groove surface 25 is spaced further from the axis A than the groove surface 23.

The depth of each groove surface, such as the depth of the groove surface 21 with respect to its proximally preceding land surface 20, corresponds substantially to the extent to which its distally proximate land surface 22 extends laterally outward of the axis A beyond its proximally preceding land surface 20. Also, each full land surface, such as the land surface 22, is longer than its proximally preceding groove surface, such as the groove surface 21.

A series of distally facing transverse fluke-like gripping surfaces are provided at the distal end of each land surface, such as the gripping surfaces 26, 27 and 28, at the distal ends of the land surfaces 20, 22 and 24, respectively. Preferably, the gripping surfaces 26-28 extend perpendicular to the longitudinal axis A of the shank 16. The length of the gripping surfaces, such as the gripping surface 26, is about one-fourth the length of the groove surfaces, such as the groove surface 21. As will be discussed more fully, the gripping surfaces 26-28 cooperate with the fibers of the wooden frame member 11 to enable a shear force to be developed for resisting pull-out of the shank 16.

According to the present invention, the specially-shaped shank surfaces are designed to utilize the elasticity of the wood to develop a strong anchoring action. This requires that the wood fibers be subjected to a minimal amount of damage during penetration of the shank thereinto so that the wood fibers retain their elasticity. As will be discussed, the wood fibers are subjected to alternate compression and expansion during penetration of the shank.

For the purpose of compressing the wood fibers gently and elastically in a lateral direction relative to longitudinal axis A of the shank 16 as it is driven into the wood, a series of camming surfaces 30, 31 and 32 are provided on the shank 16 ahead of, or proximally adjacent, each land surface, such as the land surfaces 20, 22 and 24. Except for the camming surface 30, which forms a portion of the tip 16a of the shank 16, the other camming surfaces, such as the camming surface 31, extend at an angle of not more than about 45 degrees with respect to the longitudinal axis A of the shank 16 to connect the distal end of the groove 21 with the proximal end of the land 22. Thus, each camming surface extends laterally outward beyond the profile of its proximally preceding land surface by an amount corresponding to the difference in height between the adjacent land surfaces.

With this structure, as the shank 16 is driven into the wood, the camming surface thereof, such as the camming surface 31, compress the wood fibers laterally in an elastic manner, so that when the land 22 passes the zone of the compressed wood fibers, the wood fibers expand laterally inward to fill the groove 23 which follows the land 22. As the shank 16 continues to be driven further into the wooden member 11, the thus expanded wood fibers are displaced laterally outward a further amount by the succeeding camming surface 32 and are compressed by a further amount which is related to the difference in height between the adjacent land surfaces 22 and 24. Again, after the land surface 24 passes the zone of further compressed wood fibers, they expand elastically inward into the groove 25 behind the land 24. These effects may best be seen by reference to FIG. 4, wherein the wood fibers are shown compressed in a zone Z above the land surface 22 and expanded into its distally adjacent groove surface 23 behind the fluke-like edge 27.

The aforedescribed shank structure functions to gently expand the wood fibers from a mimimum amount adjacent the shank tip 16a to a maximum amount adjacent the base 16b of the shank. As a result, minimal damage is imparted to the wood fibers so that their inherent elasticity is retained. This enables a maximum amount of normal force to be applied to the land and groove surfaces for providing an enhanced frictional force that resists pull-out of the shank 16. The aforedescribed gentle elastic displacement of the wood fibers enables them to retain their strength in the zones of the fluke-like gripping surfaces 26-28 to enable a substantial shear resistance to be developed thereat, and this aids in resisting pull-out. The flush engagement of the head shoulders 15c, 15d against the outer surface 11a of the wood distributes bearing stresses on the wood and also aids in enabling the hanger 10 to resist loosening.

By way of example, and not by way of limitation, a preferred picture frame hanger fabricated in accordance with the present invention has a thickness of less than about 0.050 inches, and at its shank 16 is preferably coated with an aqueous lacquer to enhance its gripping action. Preferably, the groove surfaces are located in a range of about 0.005 to 0.010 inches below their proximally preceding land surfaces, and more preferably about 0.0075 inches therebelow. The lateral spacing between a groove surface and its distally adjacent land surface is in a range of about 0.010 to about 0.020 inches, and more preferably about 0.0075 inches. Preferably, the length of the shank 16 is less than about one-half inch, and its maximum width adjacent its base 16b is about one-third its length. Each of the shoulders 15c, 15d of the head 15 preferably extend outwardly from the shank 16 a distance corresponding substantially to the axial extent of the shank 16 for bearing against the outer surface of the wood in the manner illustrated in FIG. 2. Preferably, the included angle of the tip 16a of the shank 16 is about 50 degrees.

In the embodiment of FIGS. 1-4, the hanger 10 is adapted to receive a wire 13 for mounting the picture frame 12 to a wall. If desired, however, a modified embodiment of the present invention may be provided which enables the frame 11 to be hung directly from a wall hook. To this end, the embodiment of FIG. 5 is provided.

In the embodiment of FIG. 5, a hanger 40 having a web 41 with a sawtooth-like upper and lower edges 41a, 41b, of conventional construction, is provided with rearwardly turned shanks 42, 43 in much the same manner as the hanger disclosed in U.S. Design Pat. No. 282,525, owned by the assignee of the present application. Unlike the shanks disclosed in the design patent, in this embodiment, the shanks 42 and 43 are provided with the same specially-shaped surfaces provided in the embodiment of FIGS. 1-4. Thus, the shanks 42, 43 enhance the resistance of the hanger 40 to separation when driven into a picture frame.

In view of the foregoing, it should be apparent that the present invention now provides an improved hanger which can be driven into a wooden frame member yet which resists separation under usual anticipating loading conditions. Because the hanger is relatively thin, it can be driven into the wood readily without requiring a pilot hole and without splitting the wood. Because of the unique design of the specially-shaped shank surfaces, the hanager resists pull-out under loading conditions usually anticipated in connection with hanging pictures.

While a preferred embodiment of the present invention has been described in detail, various modifications, alterations and changes may be made without departing from the spirit and scope of the present invention as defined in the appended claims.

We claim:

1. A hanger for connection to a wooden frame, comprising a one-piece, stamped metal member having a flat, elongate shank with a longitudinal axis and a head permitting the shank to be driven longitudinally into the wooden frame, said head having at least one distal shoulder extending laterally of the longitudinal axis of the shank and adapted to engage the surface of the wooden frame when the shank is driven therein, said shank having a proximal tapered tip and edge means providing as a series of lands and grooves disposed on at least one side of said axis between the shank tip and head shoulder, the lands and grooves including land surfaces and groove surfaces each disposed parallel to the longitudinal axis of the shank, each distally successive land surface being spaced further from said axis than its proximally preceding land surface, each distally successive groove surface being spaced further from the axis of the shank than its proximally preceding groove surface, means providing an inclined camming surface between the distal end of each groove surface and the proximal end of its succeeding land surface, and a distally facing transverse gripping surface located distally of each land surface, whereby the camming surfaces cooperate with the lands and grooves to effect elastic displacement of the wood fibers laterally of the shank as it is driven into the wood for effecting a positive gripping action that enables the hanger to resist disengagement from the wooden frame.

2. A hanger according to claim 1 wherein each distally successive land surface is located laterally outward beyond its proximally preceding land surface an amount corresponding substantially to the amount its immediately proximally preceding groove surface is recessed below said proximally preceding land surface.

3. A hanger according to claim 2 wherein said land surfaces are longer than said groove surfaces longitudinally of said shank, and said gripping surfaces are shorter than said groove surfaces.

4. A hanger according to claim 3 wherein the land surfaces are about twice as long as said groove surfaces and said groove surfaces are about four times as long as said gripping surfaces.

5. A hanger according to claim 4 wherein the groove surfaces are in a range of about 0.005 to about 0.010 inches below their proximally preceding land surfaces, and the lateral spacing between a groove surface and its distally adjacent land surface is in a range of about 0.010 to about 0.020 inches.

6. A hanger according to claim 3 wherein said lands and grooves are disposed on both sides of said longitudinal axis opposite one another, and said head has a pair of shoulders extending outward orthogonal to said shank axis.

7. A hanger according to claim 3 wherein said camming means includes a camming edge surface having a portion thereof proximally adjacent its associated land surface disposed at an angle of about 45 degrees with respect to the longitudinal axis of the shank.

8. A hanger according to claim 3 wherein the shank has a length of less than about one-half inch and a maximum width of about one-third its length, and said head shoulder extends laterally of the shank a distance corresponding substantially to the axial extent of the lands and grooves on the shank for bearing against the surface of the wood.

9. A hanger according to claim 3 including a coating of an aqueous lacquer disposed on at least said shank for enhancing its gripping action.

10. A hanger according to claim 3 wherein said head has an oblate eye with its major axis disposed transverse to the longitudinal axis of said shank to permit an article to be attached to the hanger.

11. A hanger according to claim 3 including a pair of said shanks disposed in parallel relation and an integral web with a sawtooth-like edge connecting said shanks and providing said head.

12. A hanger for connection to a wooden frame, comprising a one-piece, stamped metal member having a flat, elongate shank with a longitudinal axis and a head permitting the shank to be driven longitudinally into the wooden frame, said head having a pair of distal shoulders extending laterally of the longitudinal axis of the shank and adapted to engage the surface of the wooden frame when the shank is driven therein, said shank having a proximal tapered tip and edge means providing a series of lands and grooves disposed opposite one another on opposite sides of said axis between the shank tip and said head shoulders, the series of lands and grooves including land surfaces and groove surfaces each disposed parallel to the longitudinal axis of the shank with the land surfaces being at least as long as the groove surfaces, each distally successive land surface being spaced further from said axis than its proximally preceding land surface, each distally successive groove surface being spaced further from the axis of the shank than its proximally preceding groove surface, each groove surface being located about as far inwardly of its proximally preceding land surface as its distally succeeding land surface is located outwardly from said proximally preceding land surface, means providing inclined camming surfaces connecting the distal ends of the groove surfaces and the proximal ends of their succeeding land surfaces, and laterally extending distally facing gripping surfaces located at the distal end of each land surface, whereby the camming surfaces cooperate with the lands and grooves to effect elastic displacement of the wood fibers laterally of the shank as it is driven into the wood for effecting a positive gripping action that enables the hanger to resist disengagement from the wooden frame.

13. A hanger for connecting an article to a wooden frame, comprising a one-piece, stamped metal member having a flat, elongate shank with a longitudinal axis and a head permitting the shank to be driven longitudinally into the wooden frame, said head having a pair of distal shoulders extending laterally of the longitudinal axis of the shank and adapted to engage the surface of the wooden frame when the shank is driven therein, said shank having a proximal tapered tip and edge means providing a series of lands and grooves disposed opposite one another on opposite sides of said axis between the shank tip and said head shoulders, the series of lands and grooves including land surfaces and groove surfaces each disposed parallel to the longitudinal axis of the shank with the land surfaces being longer than the groove surfaces, each distally successive land surface being spaced further from said axis than its proximally preceding land surface, each distally successive groove surface being spaced further from the axis of the shank than its proximally preceding groove surface, each groove surface being located about as far inwardly of its proximally preceding land surface as its distally succeeding land surface is located outwardly from said proximally preceding land surface, means providing inclined camming surfaces connecting the distal ends of the groove surfaces and the proximal ends of their succeeding land surfaces and disposed at an angle not substantially greater than about 45 degrees with respect to said axis, a distally facing gripping surface located at the distal end of each land surface and disposed substantially perpendicular to its associated land and groove surfaces, whereby the camming surfaces cooperate with the lands and grooves to effect elastic displacement of the wood fibers laterally of the shank as it is driven into the wood for effecting a positive gripping action that enables the hanger to resist disengagement from the wooden frame.

* * * * *